United States Patent [19]

O'Reilley

[11] Patent Number: 5,107,559
[45] Date of Patent: Apr. 28, 1992

[54] HORSESHOEING TOOL

[76] Inventor: Ed O'Reilley, Box 72, Priddis, Alberta, Canada, T0L 1W0

[21] Appl. No.: 772,451

[22] Filed: Oct. 7, 1991

[51] Int. Cl.$^5$ ............................................. B25B 7/22
[52] U.S. Cl. ........................................ 7/127; 7/130; 7/132; 7/137
[58] Field of Search ................... 7/125, 127, 129, 130, 7/132, 133, 137, 143, 144

[56] References Cited

U.S. PATENT DOCUMENTS

| | | | |
|---|---|---|---|
| 50,303 | 10/1865 | Lawrence | 7/127 |
| 562,746 | 6/1896 | Smith | 7/130 |
| 860,122 | 7/1907 | Blair | 7/130 |
| 918,672 | 4/1909 | Hansen | 7/130 |
| 1,558,399 | 10/1925 | Rylen | 7/127 |

FOREIGN PATENT DOCUMENTS 0159512 3/1904 Fed. Rep. of Germany .......... 7/127
0008030 12/1896 Sweden ................................. 7/127

Primary Examiner—David Jones
Attorney, Agent, or Firm—George H. Dunsmuir

[57] ABSTRACT

The replacing of a shoe on a horse involves a plurality of separate tools, each performing a different function. Such tools have not changed substantially in decades. A relatively simple substitute for these tools includes a pair of arms for pivotal interconnection scissors-fashion, a first of the arms having a head including a hammer, one half of a shoe of nail gripping jaw and a slot for use when removing nails, and the second arm having a head defining the other half of the jaw and an arcuate surface for blocking a nail in a hoof. The other end of the second arm defines a toothed clincher for use in opposition to a toothed portion of this hammer for clinching nails extending from a hoof.

10 Claims, 7 Drawing Sheets

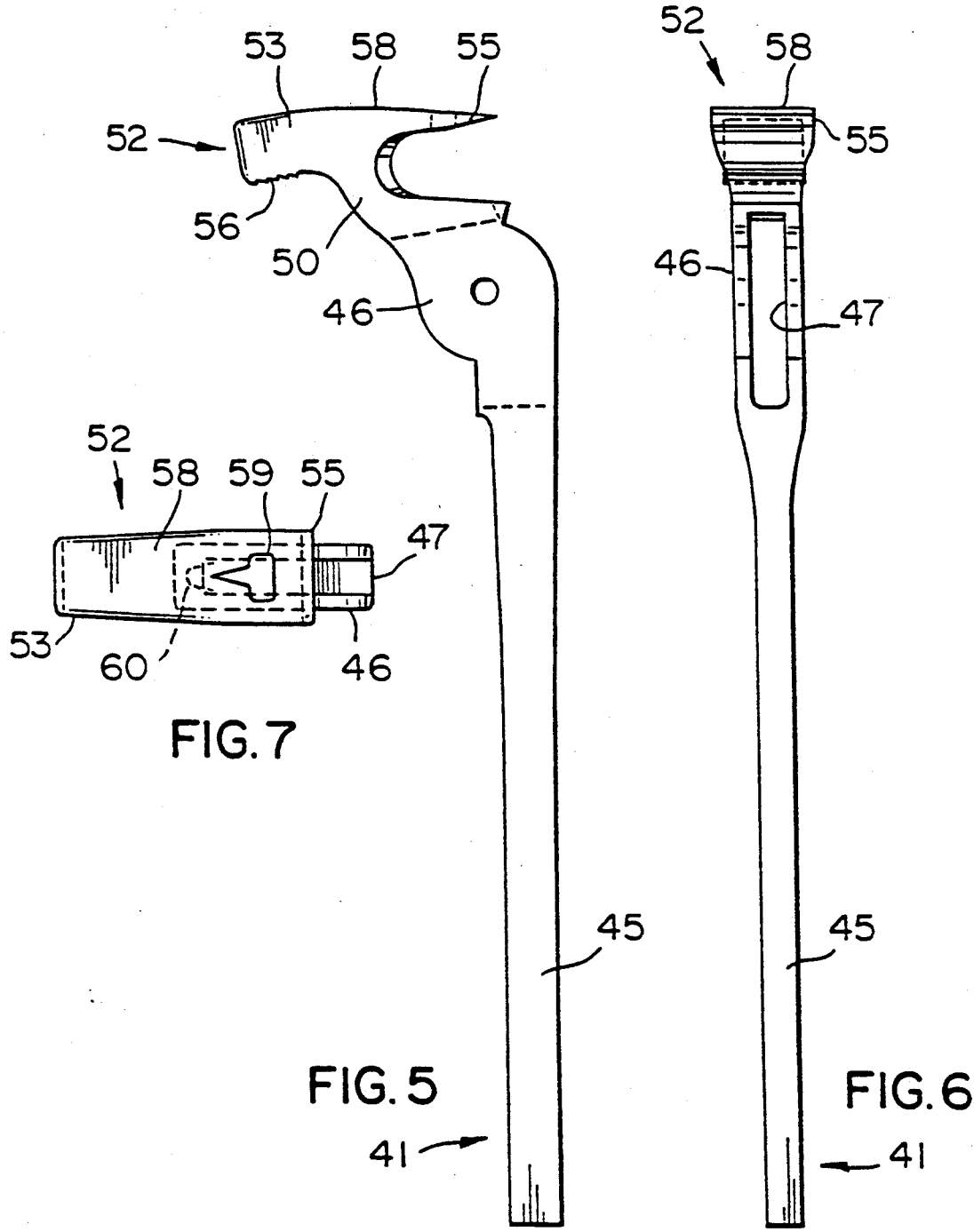

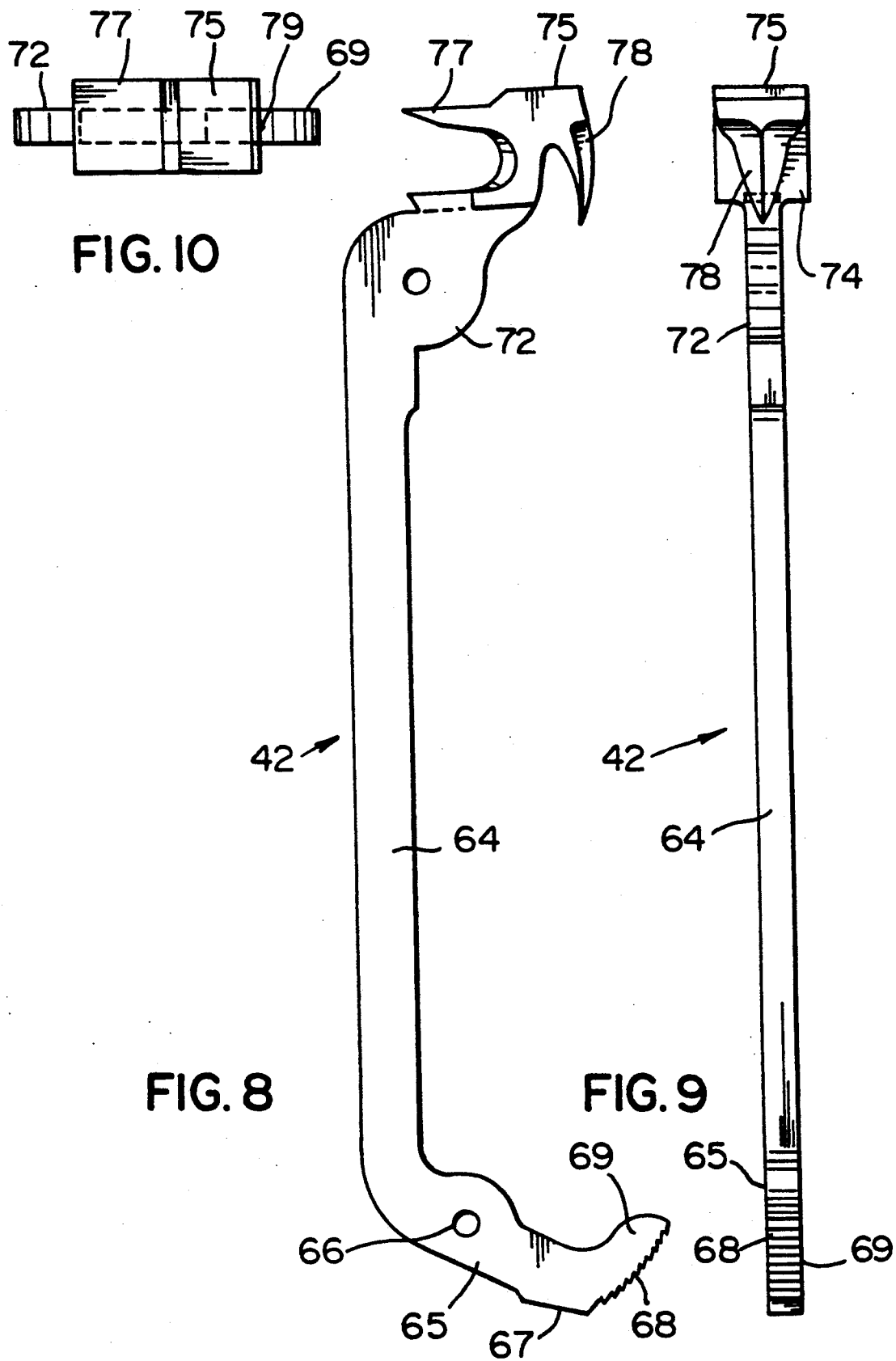

HORSESHOEING TOOL

BACKGROUND OF THE INVENTION

This invention relates to a horseshoeing tool, and in particular to a multi-function horseshoeing tool.

The art of shoeing horses, i.e. removing worn shoes, trimming the hoof, and mounting a fresh shoe on the hoof has not changed substantially for decades. Several tools are required to carry out the task. The tools include a puller for pulling nails or pulling off the shoe; a cutter and a nipper for trimming the hoof, a claw hammer for removing and inserting nails, a block, which is used with the hammer for blocking nails, and a clincher for bending the sharp ends of nails protruding from a hoof.

The object of the present invention is to avoid the need for a large number of tools by providing a relatively simple horseshoeing tool, which is capable of performing the functions of all the tools listed above.

SUMMARY OF THE INVENTION

Accordingly, the present invention relates to a horseshoeing tool comprising first elongated arm means; second elongated arm means for pivotal connection to said first arm means; jaw means on one end of each said first and second arm means for gripping a shoe for removal thereof, and for cutting a hoof; hammer means on said one end of said first arm means for hammering a nail into a hoof; slot means in said one end of said first arm means for pulling a nail; blocker means on said one end of said second arm means for use with said hammer means to bend the pointed end of a nail protruding from a shoe; and clincher means on the other end of said second arm means cooperating with said jaw means on said first arm means to enable clinching of a nail protruding from a hoof.

BRIEF DESCRIPTION OF THE DRAWINGS

The invention will be described in greater detail with reference to the accompanying drawings, which illustrate preferred embodiments of the invention, and wherein:

FIG. 5 is a side view of one arm of the tool of FIG. 4;

FIG. 6 is an end view of the arm of FIG. 5;

FIG. 7 is a top view of the arm of FIG. 4;

FIG. 8 is a side view of a second arm of the tool of FIG. 4;

FIG. 9 is an end view of the arm of FIG. 8;

FIG. 10 is a top view of the arm of FIG. 8;

DESCRIPTION OF THE PREFERRED EMBODIMENTS

Figure 1:
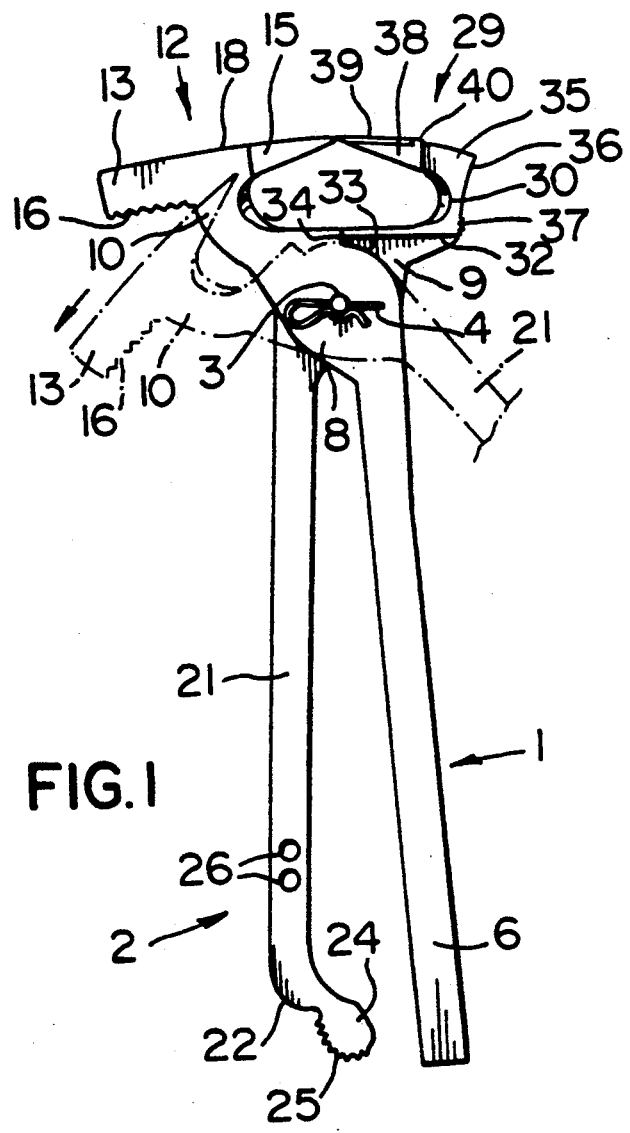
FIG. 1 is a side view of a horseshoeing tool in accordance with the present invention.
Figure 2:
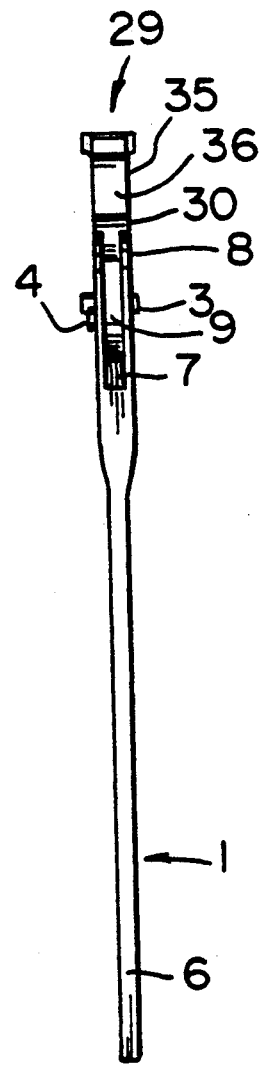
FIG. 2 is an end view of the tool of FIG. 1 as seen from the right thereof.
Figure 3:
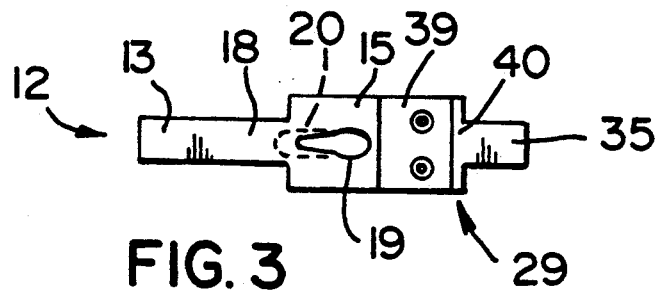
FIG. 3 is a top view of the tool of FIGS. 1 and 2.

Referring to FIGS. 1 to 3, the basic elements of one embodiment of the horseshoeing tool of the present invention include a pair of arms generally indicated at 1 and 2, which are pivotally interconnected scissors-fashion by a pin 3. The pin 3 is removably mounted in the arms 1 and 2, and is held in place by a cotter pin 4.

One arm 1 includes a thin straight, elongated shank defining a handle 6. A slot 7 is provided in the wider end or shoulder 8 of the handle 6 for receiving the shoulder 9 of the arm 2. The shoulder 8 is generally circular, extending outwardly to one side of the longitudinal axis of the handle 6. An arcuate neck 10 joins the shoulder 8 to a head generally indicated at 12. The head 12 includes a rectangular cross section hammer 13 on one end and a tapering jaw 15 on the other end thereof. In one assembled condition of the arms 1 and 2 (FIG. 1), the hammer 13 is on the outside of the tool and the jaw 15 is on the inside thereof. Serrations or teeth 16 extend across the bottom surface of the hammer 13. The top surface 18 of the head 12 is slightly convex, the jaw 15 being in the highest or outermost plane thereon. A keyhole slot 19 with a countersunk bottom end 20 (for receiving nail heads) is provided in the jaw 15.

The arm 2 is defined by an elongated, rectangular cross section shank or handle 21 with an inwardly curving bottom end 22 (i.e. The end 22 curves towards the arm 1 at the bottom end thereof). The bottom end 22 tapers inwardly and downwardly to a generally oval foot 24, which, as described hereinafter in greater detail, defines a part of a clincher device. For such purpose, serrations or teeth 25 are provided on the bottom and outer surfaces of the foot 24. A pair of spaced apart holes 26 extend through the handle 21 above and proximate the foot 24 for receiving the pin 3 when the arms 1 and 2 are disassembled and reassembled in a different configuration from that shown in FIGS. 1 to 3.

The shoulder 9 near the top end of the handle 21 is connected to a head generally indicated at 29 by an arcuate neck 30. In the assembled condition of FIG. 1, the shoulder 9 rotates in the slot 7. The straight bottom edge 32 of the wider head opposes the arcuate top edge 33 of the shoulder 8. A vertical stop 34 is provided at the top end of the edge 33 for limiting movement of the heads 12 and 29 towards each other.

The head 29 includes a narrow outer end 35 with a concave outer surface 36, which has teeth 37 on the bottom end thereof. The top end of the head 29 tapers inwardly, defining a jaw 38 in opposition to the jaw 15. A hardened steel anvil 39 is provided in the inner convex top end 40 of the jaw 38.

With reference to FIGS. 4 to 10, the second embodiment of the tool is similar to that shown in FIGS. 1 to 3, including a pair of jaws generally indicated at 41 and 42, which are pivotally interconnected near their top ends by a pin 43. The pin 43 is held in place by a cotter pin (not shown) which can be removed to change the configuration of the tool.

The arm 41 includes a thin, straight handle 45 with a wider, circular shoulder 46 containing a slot 47 for receiving the circular shoulder 49 of the arm 42. The shoulder 46 extends outwardly from one side of the longitudinal axis of the handle 41. A tapering, arcuate neck 50 joins the shoulder 46 to a head generally indicated at 52. The head 52 includes a rectangular cross section, gently outwardly tapering hammer 53 on one side and a tapering jaw 55 on the other side thereof. In one assembled condition of the tool (FIG. 4), the hammer 53 is on the outside of the tool and the jaw 55 is on the inside thereof. Serrations or teeth 56 extend across the bottom surface of the hammer 53. The top surface 58 of the head 52 is convex, the jaw 55 being in the highest plane thereof. A keyhole slot 59 with a nail head-receiving, countersunk bottom end 60 (FIG. 7) is provided in the jaw 55. Thus, the arm 41 is similar to the arm of the tool shown in FIGS. 1 to 3.

Referring to FIGS. 4 and 8 to 10, the arm 42 is similar to the arm 2, including an elongated, rectangular cross section handle 64 with a bottom end 65 which extends inwardly to a location beneath the bottom end of the arm 41. The elongated, inclined bottom end 65 of the arm 42 includes a hole 66 for receiving the pin 43, a flat bearing surface 67, and an arcuate row of teeth 68 on the upwardly curving free end 69 thereof. The teeth 68, are employed when the tool is used as a clincher device. As in the first embodiment, a circular shoulder 72 is provided at the top of the handle 64. The shoulder is connected by an arcuate neck 74 extending upwardly and outwardly from the shoulder 72 to a rectangular cross section head 75. Most of the neck 74 is as thick as the head for lending strength and weight to the head end of the tool. A tapering jaw 77 extends inwardly from one side of the head 75, and a lanceolate claw 78 extends outwardly and downwardly from the other side thereof.

The use of the tool of FIGS. 1 to 3 will be described with reference to FIGS. 11 to 16 of the drawings. In order to show a norse, the first operation is to remove the word shoe 84 from the hoof 85 of the horse. For such purpose, the two arms 1 and 2 of the tool are interconnected scissors-fashion using the pins 3 and 4 with the jaws 15 and 38 in opposition (FIG. 1). With the jaws 15 and 38 (FIG. 1) or 55 and 77 (FIG. 4) in opposition, the necks 10 and 30 (FIG. 1) or 50 and 74 (FIG. 4) define a generally inverted heart-shaped loop for receiving the shoe 85. The tool is used in the same manner as a pair of pliers, the jaws 15 and 38 being inserted beneath the shoe 84 and squeezed together to pry the shoe loose. Once the shoe 84 has been removed, the hoof 85 is trimmed (FIG. 12)-again using the tool in the condition shown in FIGS. 1 to 3. Of course, for a horse which has never been shod, the first, shoe removal step is eliminated.

Figure 13:
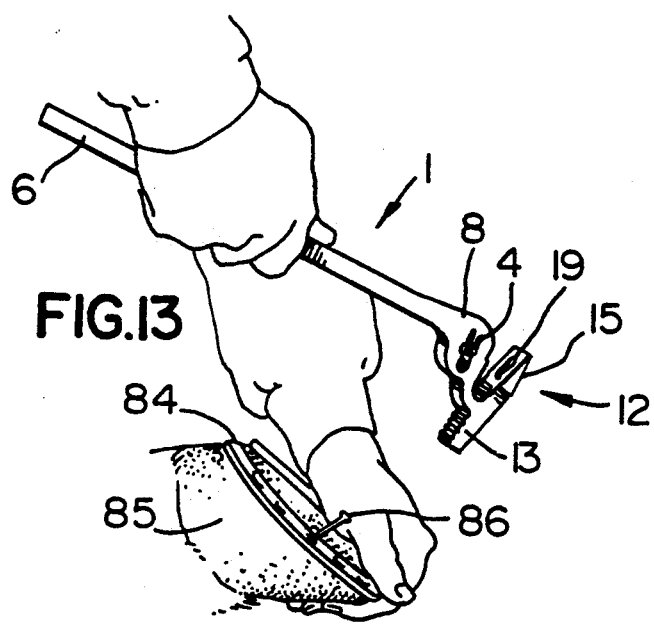
Figure 14:
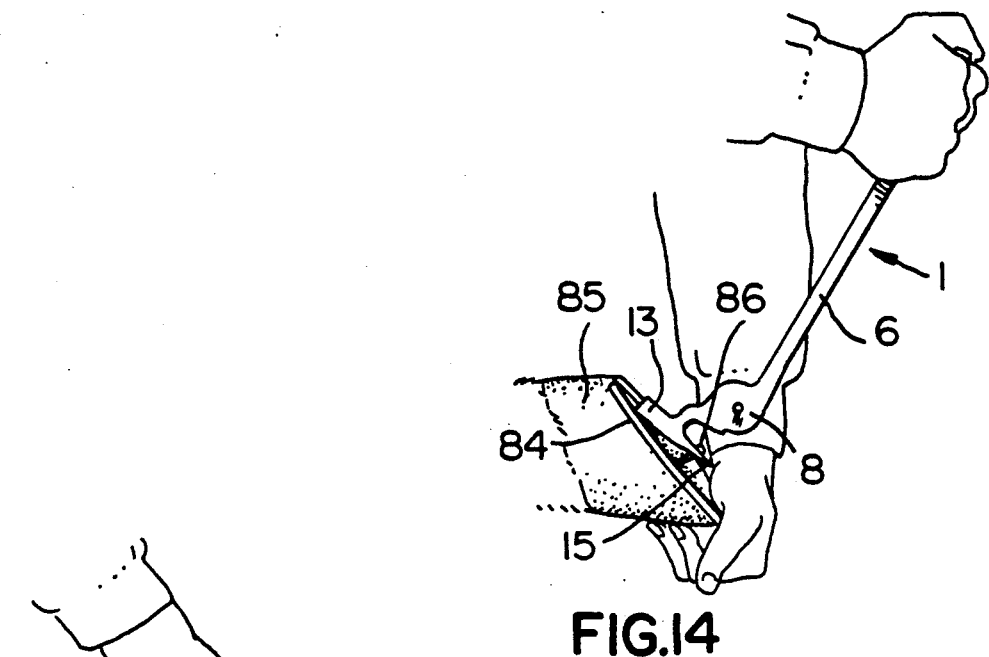
Figure 15:
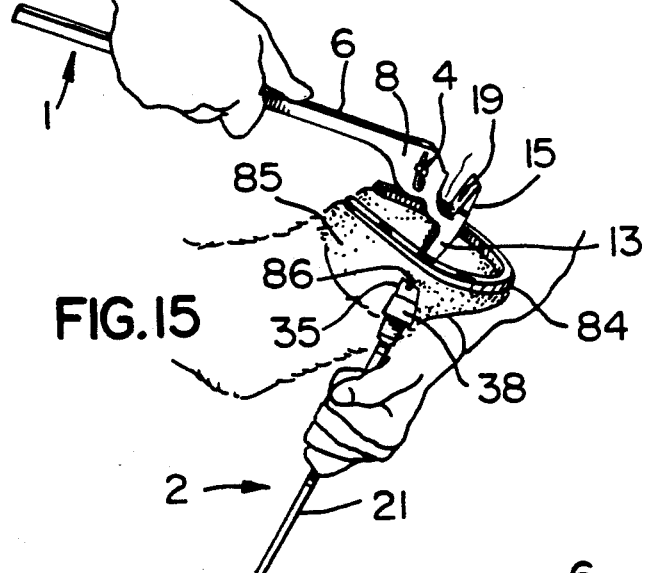
Figure 16:
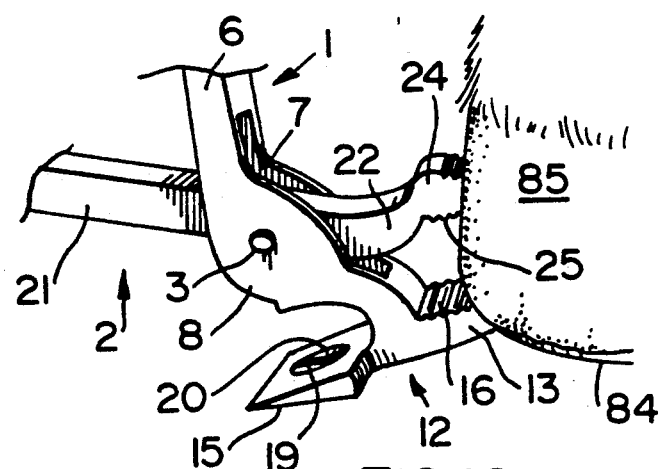

A new shoe 84 is placed on the hoof and nails 86 are hammered into place using the hammer 13 on the arm 1 alone (FIG. 13). If a nail 86 must be removed from the hoof 85 at any time, the arm 1 is used alone (FIG. 14), the head of the nail being inserted into the countersunk portion 20 of the slot 19, and the arm rotated in the same manner as a claw hammer.

With the shoe 84 in place, the pointed ends of the nails 86 are blocked using the two arms 1 and 2 free of each other. For such purpose, the narrow, convex end 35 of the head 29 (arm 2) is placed against the hoof 85, and the hammer 15 on the arm 1 is used to drive the nail 86 home while bending the pointed end outwardly.

Finally the two arms 1 and 2 are reassembled (FIG. 16) with the end 22 of the arm 2 extending through the slot 7. The arms 1 and 2 are used scissors-fashion with the teeth 16 of arm 1 engaging the shoe 84, and the teeth 25 of the arm 2 engaging the side of the hoof 85 and the end of the nail 86. The tool is again used scissors-fashion to clinch the nail, i.e. to bend the nail over towards the shoe 84.

Figure 17:
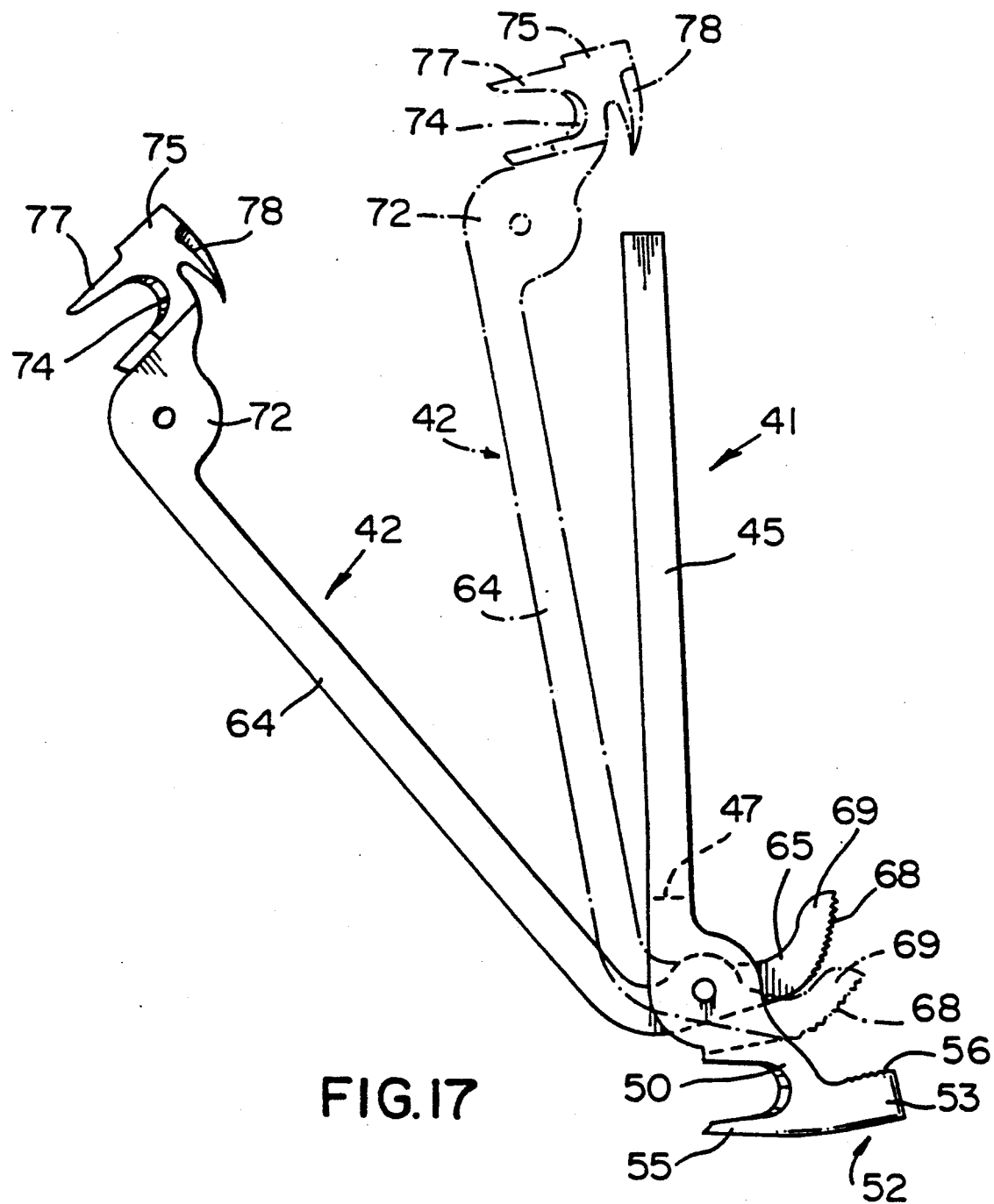
FIG. 17 is a schematic side view of the tool of FIG. 4 in use during a nail clinching operation.

FIG. 17 illustrates the use of the second embodiment of the invention (the tool of FIGS. 4 to 10) as a clincher. When clinching a nail, the arm 42 rotates from the position shown in solid outline to the position shown in phantom outline in FIG. 17.

Figure 4:
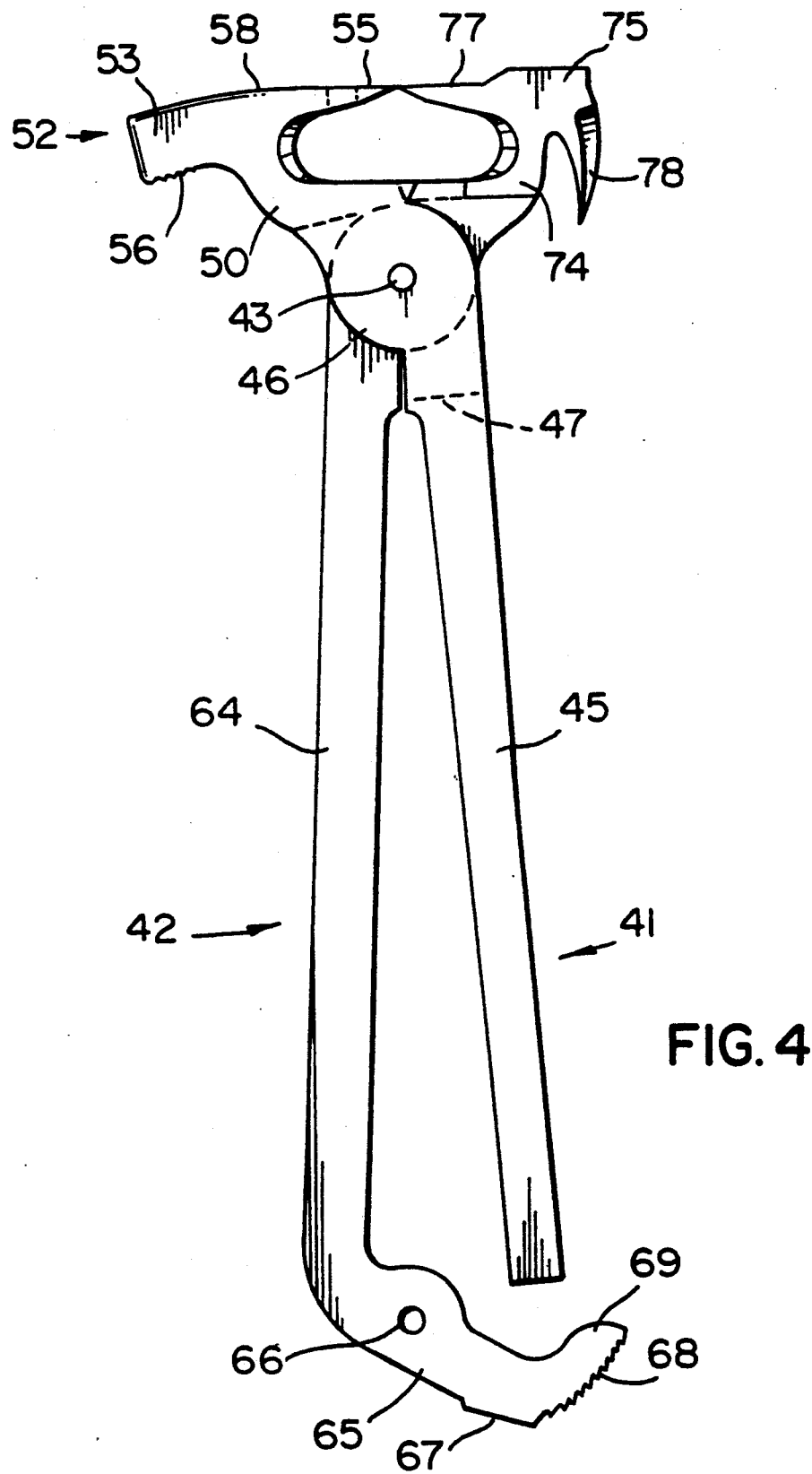
FIG. 4 is a side view of a second embodiment of the horseshoeing tool of the present invention.
Figure 11:
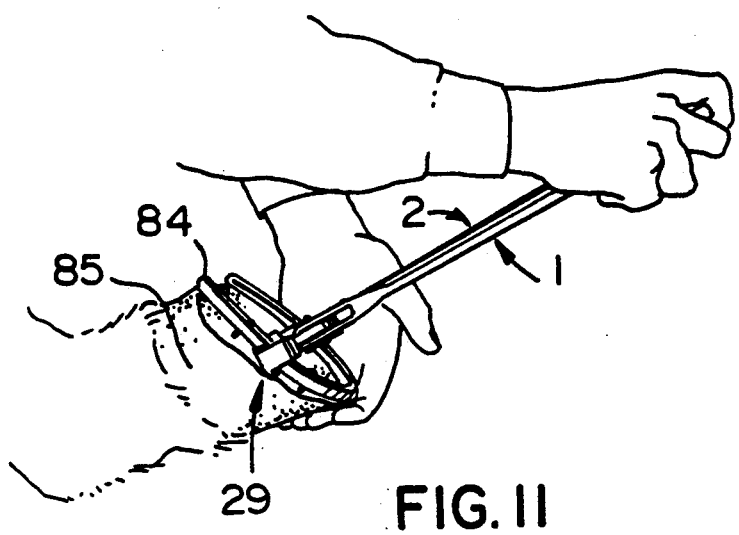
FIGS. 11 to 16 are schematic, perspective views of the tool of FIGS. 1 to 3 in use.
Figure 12:
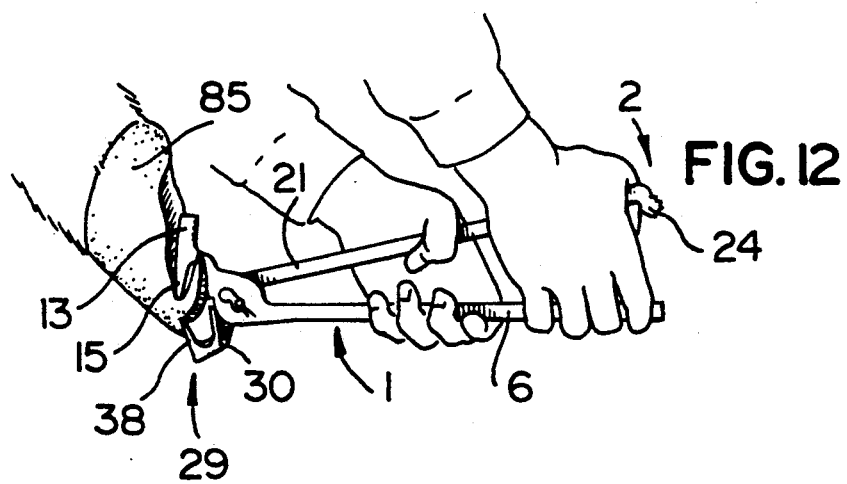

The tool of FIG. 4 also includes the claw 78 on the end of the head 75 opposite the jaw 77. The claw is used like a pry bar to loosen shoes firmly attached to hooves.

What is claim is:

1. A horseshoeing tool comprising first elongated arm means; second elongated arm means for pivotal connection to said first arm means; jaw means on one end of each said first and second arm means for gripping a shoe for removal thereof, and for cutting a hoof; hammer means on said one end of said first arm means for hammering a nail into a hoof; slot means in said one end of said first arm means for pulling a nail; means on said one end of said second arm means for use with said hammer means to bend a pointed end of a nail protruding from a shoe; and clincher means on the other end of said second arm means for cooperating with said jaw means on said first arm means to enable clinching of a nail protruding from a hoof.

2. A tool according to claim 1, including first head means on said first arm means, said first head means defining said second jaw and said hammer means, and containing said slot means.

3. A tool according to claim 2, including second head means on said second arm means, said second head means defining said second jaw means and said means for use with said hammer means to bend the pointed end of said nail.

4. A tool according to claim 3, wherein said first arm means includes straight first handle means, a substantially circular first shoulder means mounted on one end of said first handle means and arcuate first neck means connecting said first handle means to said first head means.

5. A tool according to claim 4, wherein said second arm means includes straight second handle means, a substantially circular second shoulder means mounted on one end of said said second handle means; and arcuate second neck means connecting said second handle means to said second head means, whereby, in one configuration of the tool, the first and second jaw means oppose each other and the first and second neckmeans define a shoe receiving loop.

6. A tool according to claim 5, including slot means in said first shoulder means for receiving said second shoulder means; and pin means for releasably and pivotally interconnecting said first and second shoulder means with said first and second jaw means opposed to each other, and for releasably and pivotally connecting said one end of said first handle means to said other end of said second handle means, whereby said hammer means is placed in opposition to said clincher means for clinching a nail protruding from a hoof.

7. A tool according to claim 6, including tooth means on said hammer means and on said clincher means for facilitating a clinching operation.

8. A tool according to claim 6, wherein the other end of said second handle means is inclined towards said first arm means when the first and second jaw means are opposed and abutting, said other end of the second handle means defining said clincher means.

9. A tool according to claim 8, wherein said clincher means intersects a longitudinal axis of said first handle means in the jaws means abutting configuration of the tool.

10. A tool according to claim 5, wherein said second arm means includes claw means on said second head means opposite said second jaw means.

* * * * *